Nov. 20, 1928.

R. H. CARPMAEL 1,692,721

MOTOR VEHICLE RADIATOR

Filed Feb. 2, 1928

INVENTOR:
RICHARD HERBERT CARPMAEL.
By his Attorneys,

Patented Nov. 20, 1928.

1,692,721

UNITED STATES PATENT OFFICE.

RICHARD HERBERT CARPMAEL, OF MOULTON, ENGLAND.

MOTOR-VEHICLE RADIATOR.

Application filed February 2, 1928, Serial No. 251,385, and in Great Britain November 22, 1926.

This invention relates to improvements in motor vehicle radiators, and has for its object to prevent cooling of the engine when not in use, being especially adapted for use in cold weather to prevent freezing of the radiator water.

According to this invention I provide means for supplying heat to a radiator in combination with means for preventing the normal passage of air through the core thereof and restricting its entrance to the base of said core under novel, regulated control.

When driving, air may be admitted to the radiator by adjusting the position of a shutter, with which the radiator is provided, which will permit air to pass through the radiator core to cool the engine in the usual way. When, however, the car is not in use or stationary, the shutter is used to close the shield and the heating means may be turned on so that a warm current of air may pass through the radiator core whereby freezing of the engine is prevented.

Figure 1:
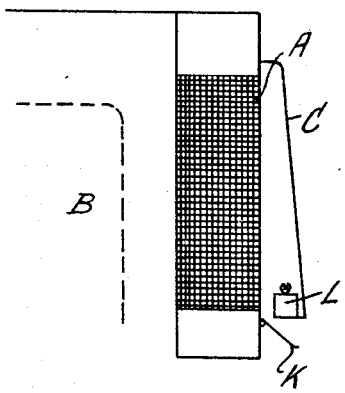
Figure 2:
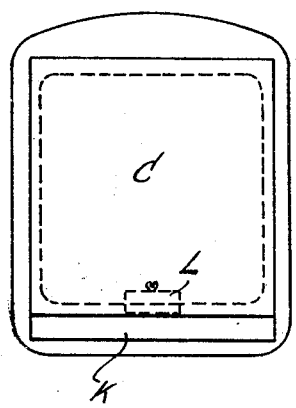

The invention is diagrammatically illustrated in the accompanying drawings in which Figure 1 is a sectional view of a radiator constructed in accordance with this invention and Figure 2 is a front view thereof.

Referring to the drawings A designates the radiator core through which the water or other liquid for cooling the engine B circulates.

A shield C is located in front of the radiator A so as to enclose the front portion of the core of the radiator. It should be noted that the shield C is set off at an appreciable distance from the front of the radiator so as to leave an air space. Located at the bottom of the shield C is a heater L which may be a bulb, oil lamp or other source of heat.

The shield C restricts the entrance of air to the base of the core and at this location a shutter K is provided which may be opened when the engine is running or closed when the engine is at rest.

With this construction very efficient results have been obtained and it possesses the advantage that the fan or any other parts inside the bonnet is not in any way interfered with.

It will be found that with such an arrangement a considerable saving in labor and petrol is obtained since by preventing the engine from getting cold no difficulty is experienced in starting up and the engine can be run on full air immediately which is not normally the case until about five miles have been run and the engine has warmed up.

What I claim is:—

In combination with a radiator and its core, a shield at the front of the core restricting the entrance of air and insuring entrance thereof at the lower end of the core, heating means carried by the shield at its lower end, and an air-regulating shutter carried by the lower part of the radiator, said shutter being movable toward and away from said end.

In testimony that I claim the foregoing as my invention I have signed my name this 18th day of January, 1928.

RICHARD HERBERT CARPMAEL.